US00RE49993E

(19) United States
(12) Reissued Patent
Twohig et al.

(10) Patent Number: US RE49,993 E
(45) Date of Reissued Patent: Jun. 4, 2024

(54) INPUT DEVICE

(71) Applicant: Logitech Europe S.A., Lausanne (CH)

(72) Inventors: Marcel Twohig, Dublin (IE); Yi Hsuan Lin, New Taipei (TW); Anish Shakthi Ovia Selvan, Bangalore (IN); Jean-Christophe Hemes, Grandson (CH); Jasper Phua, Morges (CH); Blaithin Crampton, County Meath (IE)

(73) Assignee: Logitech Europe S.A., Lausanne (CH)

(21) Appl. No.: 29/863,702

(22) Filed: Dec. 21, 2022

Related U.S. Patent Documents

Reissue of:
(64) Patent No.: Des. 925,538
Issued: Jul. 20, 2021
Appl. No.: 29/724,421
Filed: Feb. 14, 2020

(51) LOC (14) Cl. ..... 04-02
(52) U.S. Cl.
USPC ..... D14/410
(58) Field of Classification Search
USPC ..... D14/300, 301, 302, 315, 316, 318, 320, D14/322, 328, 333, 334, 335, 345, 348, D14/392, 434, 455, 456, 457; D18/2, 7, D18/11
CPC ..... G06F 3/03543; G06F 2203/0333; G06F 3/039; G06F 3/038; G06F 2203/0384
See application file for complete search history.

(56) References Cited

U.S. PATENT DOCUMENTS

| | | | | | |
|---|---|---|---|---|---|
| D541,804 | S | * | 5/2007 | Chatterjee | D14/408 |
| D581,417 | S | * | 11/2008 | Huang | D14/408 |
| D607,454 | S | * | 1/2010 | Reed | D14/408 |
| D630,214 | S | * | 1/2011 | Kim | D14/408 |
| D638,428 | S | * | 5/2011 | Kujawski | D14/409 |
| D640,257 | S | * | 6/2011 | Lee | D14/410 |
| D657,360 | S | * | 4/2012 | Kujawski | D14/402 |
| D665,806 | S | * | 8/2012 | Lee | D14/408 |
| D711,380 | S | * | 8/2014 | Urban | D14/410 |
| D738,884 | S | * | 9/2015 | Zheng | D14/408 |
| D755,180 | S | * | 5/2016 | Pascucci | D14/409 |
| D771,046 | S | * | 11/2016 | Jost | D14/410 |
| D820,843 | S | * | 6/2018 | Lu | D14/402 |
| D826,939 | S | * | 8/2018 | Chong | D14/402 |
| D830,361 | S | * | 10/2018 | Jin | D14/402 |
| D844,000 | S | * | 3/2019 | Lee | D14/410 |
| D845,300 | S | * | 4/2019 | Chong | D14/410 |
| D845,948 | S | * | 4/2019 | Jin | D14/410 |
| D892,117 | S | * | 8/2020 | Chong | D14/409 |
| D903,679 | S | * | 12/2020 | Xu | D14/410 |
| D903,680 | S | * | 12/2020 | Xu | D14/410 |
| D904,409 | S | * | 12/2020 | Xu | D14/410 |

* cited by examiner

*Primary Examiner* — Philip S Hyder
(74) *Attorney, Agent, or Firm* — Kilpatrick Townsend & Stockton LLP

(57) CLAIM

The ornamental design for an input device, as shown and described.

DESCRIPTION

*This application is a reissue of U.S. Design patent application Ser. No. 29/724,421, filed Feb. 14, 2020, now U.S. Design patent No. D. 925,538, issued Jul. 20, 2021, and titled "Input Device," the disclosure of which is herein incorporated by reference in its entirety for all purposes.*
FIG. 1 is a perspective view of *a first embodiment of* an input device showing [my] *our* new design;
FIG. 2 is a top plan view thereof;
FIG. 3 is a bottom plan view thereof;
FIG. 4 is a front side elevation view thereof;
FIG. 5 is a rear side elevation view thereof;
FIG. 6 is a left side elevation view thereof; and
FIG. 7 is a right side elevation view thereof.
*FIG. 8 is a perspective view of a second embodiment of an input device showing our new design;*
*FIG. 9 is a top plan view thereof;*
*FIG. 10 is a bottom plan view thereof;*
*FIG. 11 is a front side elevation view thereof;*

(Continued)

*Amended*

*FIG. 12 is a rear side elevation view thereof;*
*FIG. 13 is a left side elevation view thereof; and*
*FIG. 14 is a right side elevation view thereof.*
*FIG. 15 is a perspective view of a third embodiment of an input device showing our new design;*
*FIG. 16 is a top plan view thereof;*
*FIG. 17 is a bottom plan view thereof;*
*FIG. 18 is a front side elevation view thereof;*
*FIG. 19 is a rear side elevation view thereof;*
*FIG. 20 is a left side elevation view thereof; and*
*FIG. 21 is a right side elevation view thereof.*
*FIG. 22 is a perspective view of a fourth embodiment of an input device showing our new design;*
*FIG. 23 is a top plan view thereof;*
*FIG. 24 is a bottom plan view thereof;*
*FIG. 25 is a front side elevation view thereof;*
*FIG. 26 is a rear side elevation view thereof;*
*FIG. 27 is a left side elevation view thereof; and*
*FIG. 28 is a right side elevation view thereof.*
*FIG. 29 is a perspective view of a fifth embodiment of an input device showing our new design;*
*FIG. 30 is a top plan view thereof;*
*FIG. 31 is a bottom plan view thereof;*
*FIG. 32 is a front side elevation view thereof;*
*FIG. 33 is a rear side elevation view thereof;*
*FIG. 34 is a left side elevation view thereof; and*
*FIG. 35 is a right side elevation view thereof.*

The broken lines depict portions of the input device in which the design is embodied that form no part of the claimed design. *The broken lines are generally intended to disclaim only said lines, seams, or other surface features, and not any area contained within or adjacent to said broken lines, unless the broken line represents a disclaimed button, the scroll wheel, or a portion of the bottom surface of the input device. For context, there is a top button behind the scroll wheel and two left-side side buttons configured above the ribbing—in embodiments where the scroll wheel, one or more of said buttons, or the bottom surface is represented by broken lines, the entire area defining said button, scroll wheel, and/or bottom surface is intended to be disclaimed, as implied by the lack of shading within the disclaimed portion of those features.*

1 Claim, 30 Drawing Sheets

---

Matter enclosed in heavy brackets [ ] appears in the original patent but forms no part of this reissue; matter printed in italics indicates the additions made by reissue.

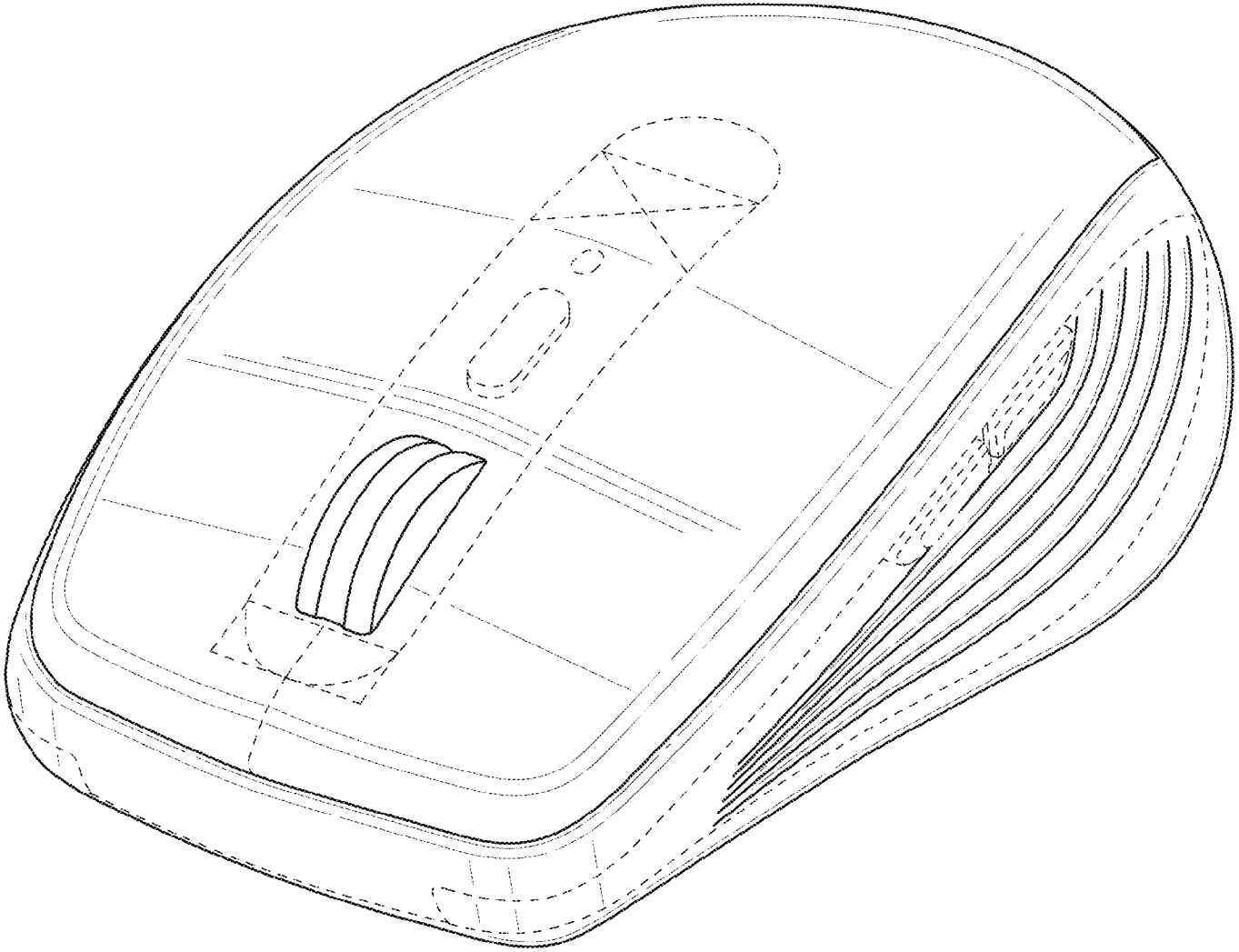
FIG. 1
Amended

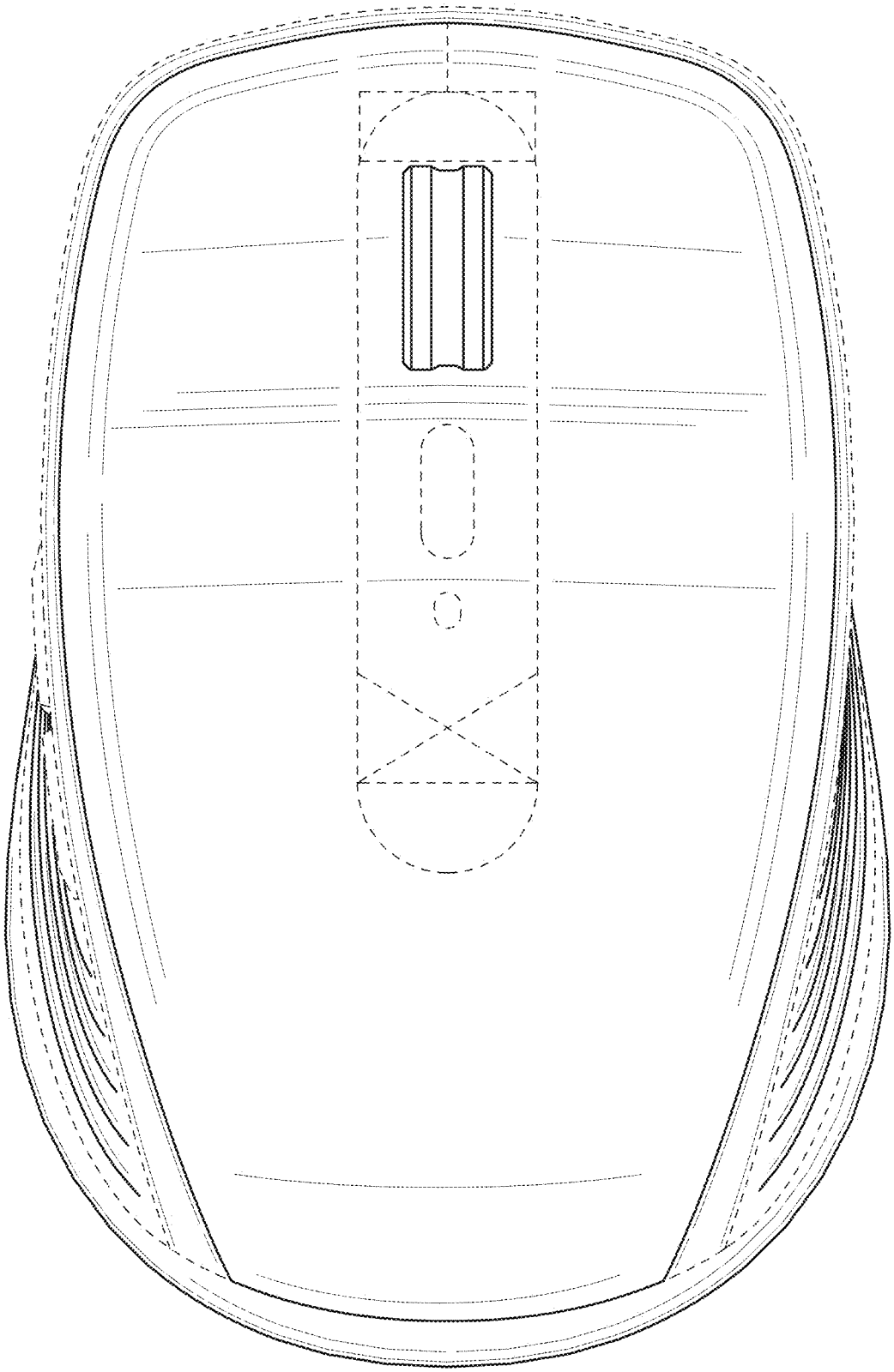
FIG. 2
Amended

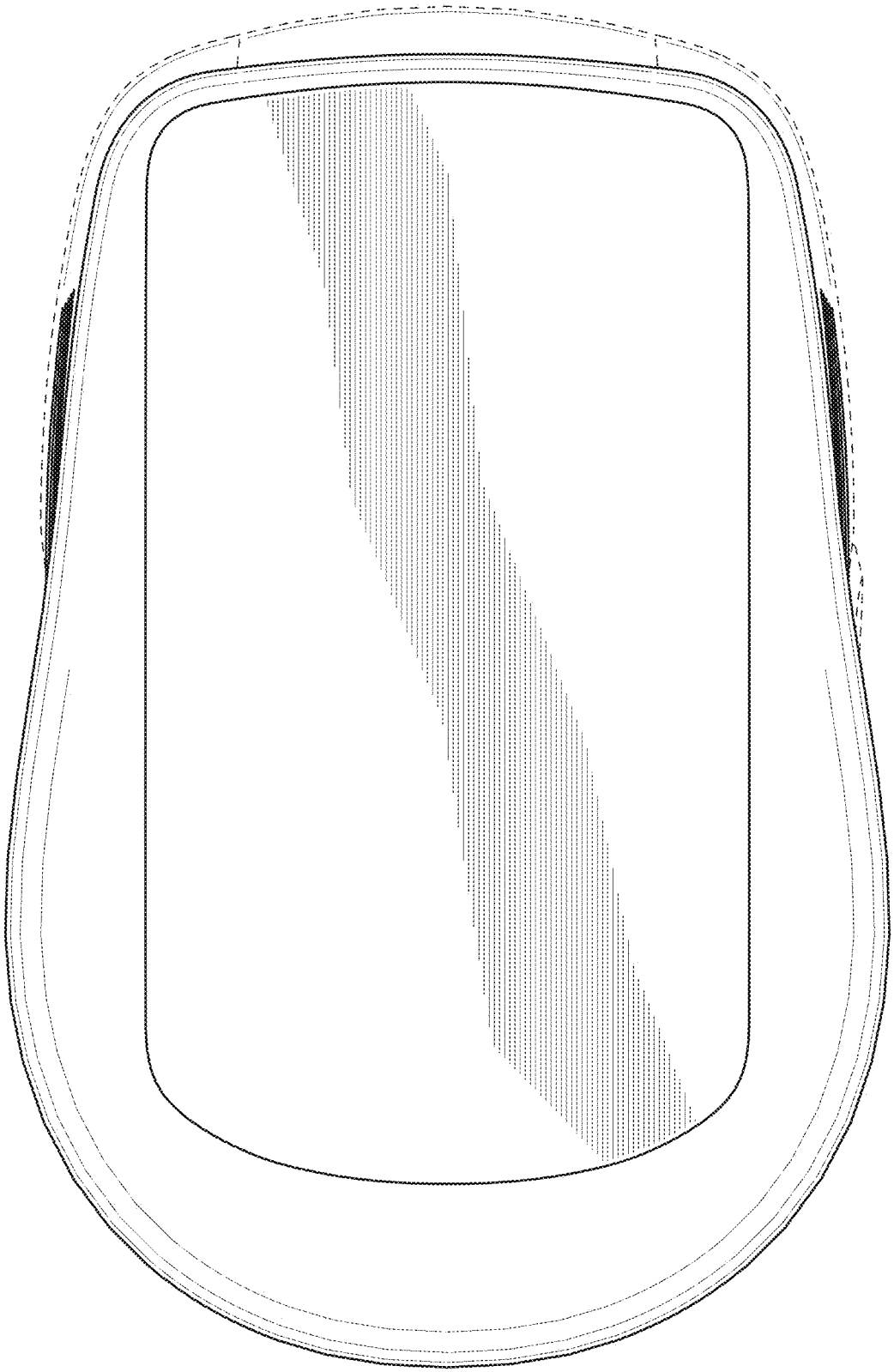
FIG. 3
Amended

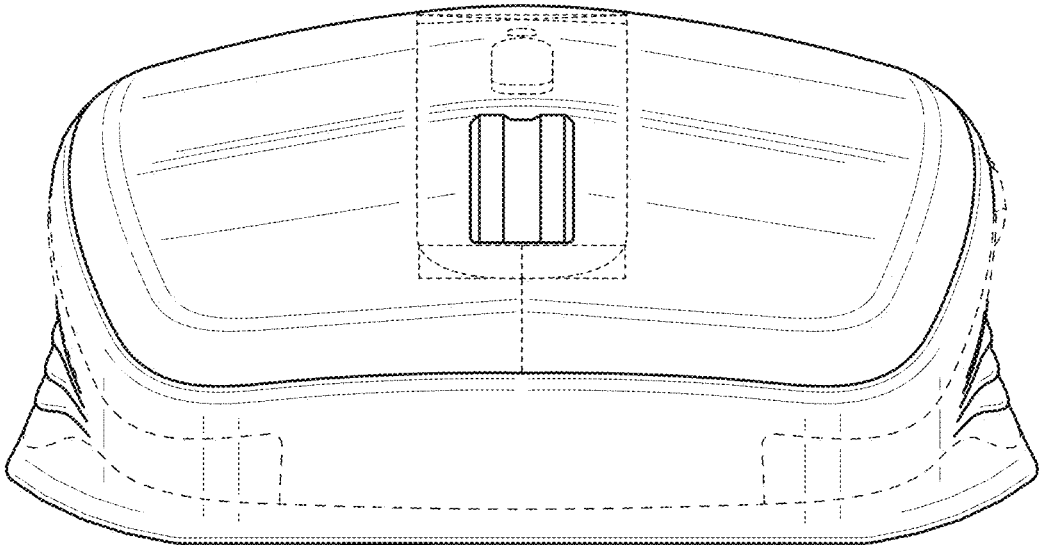
FIG. 4
Amended
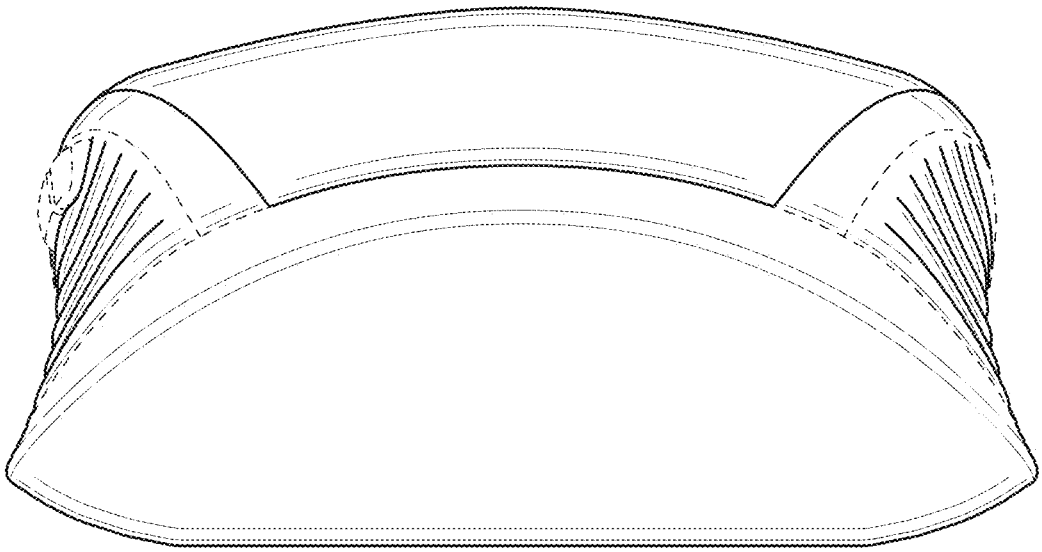
FIG. 5
Amended

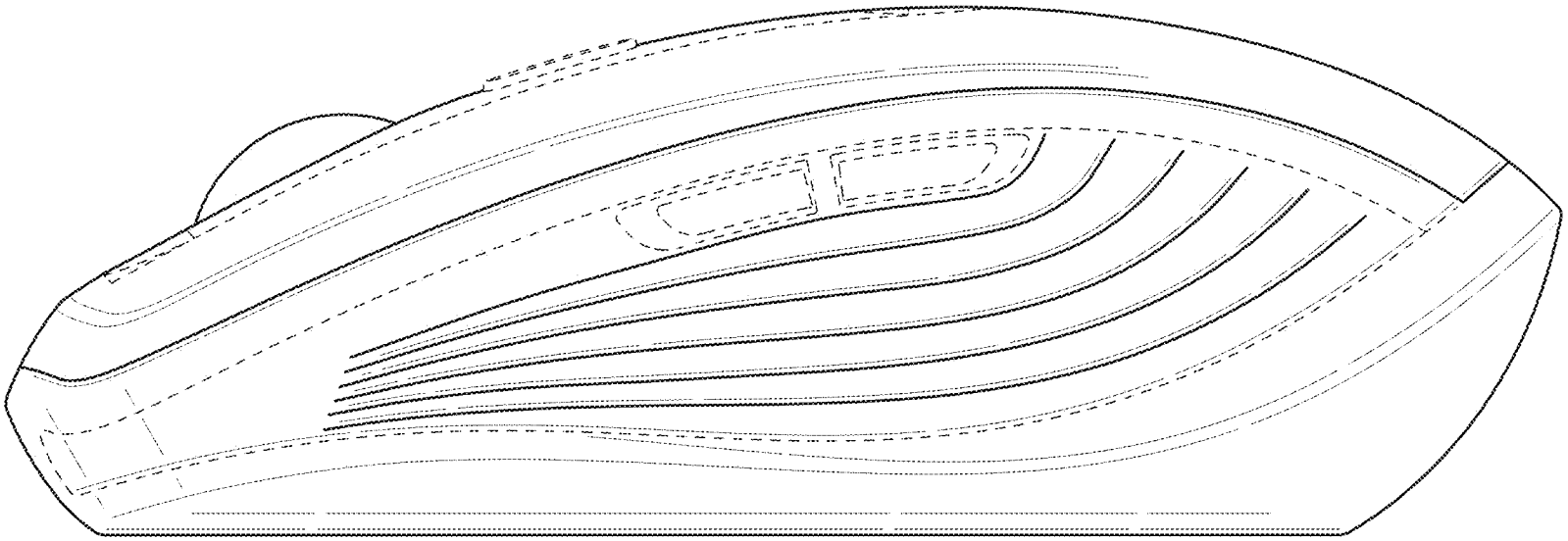
FIG. 6
Amended

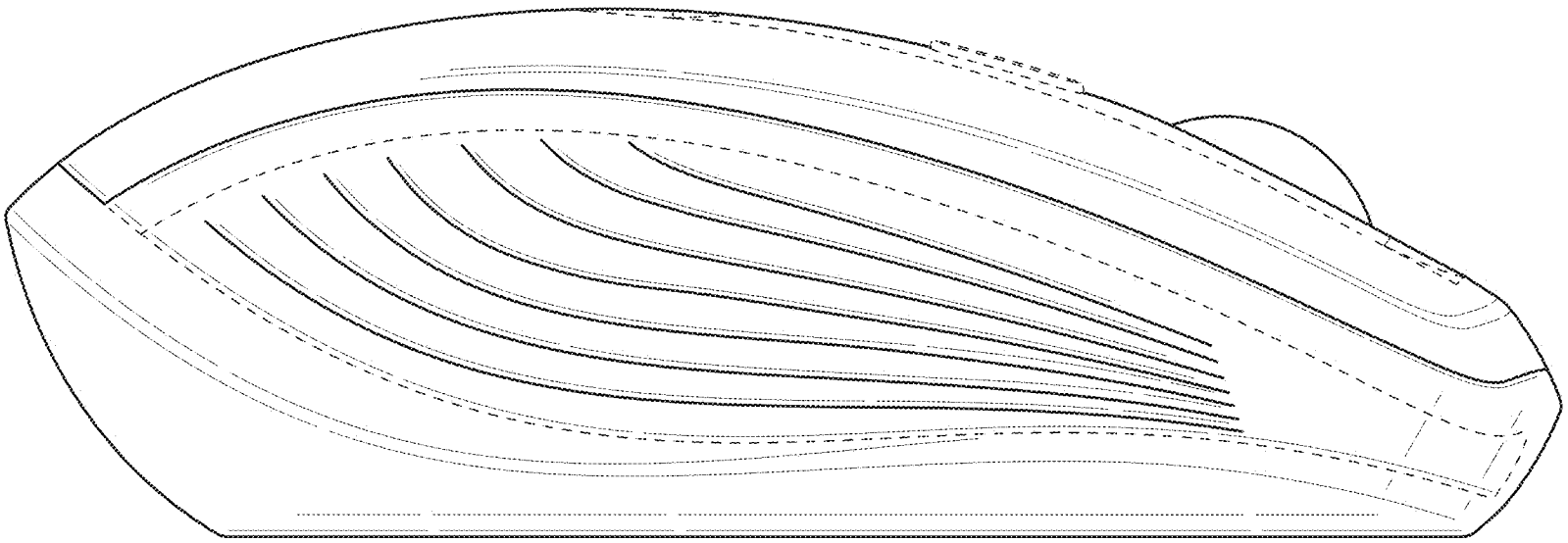
FIG. 7
Amended

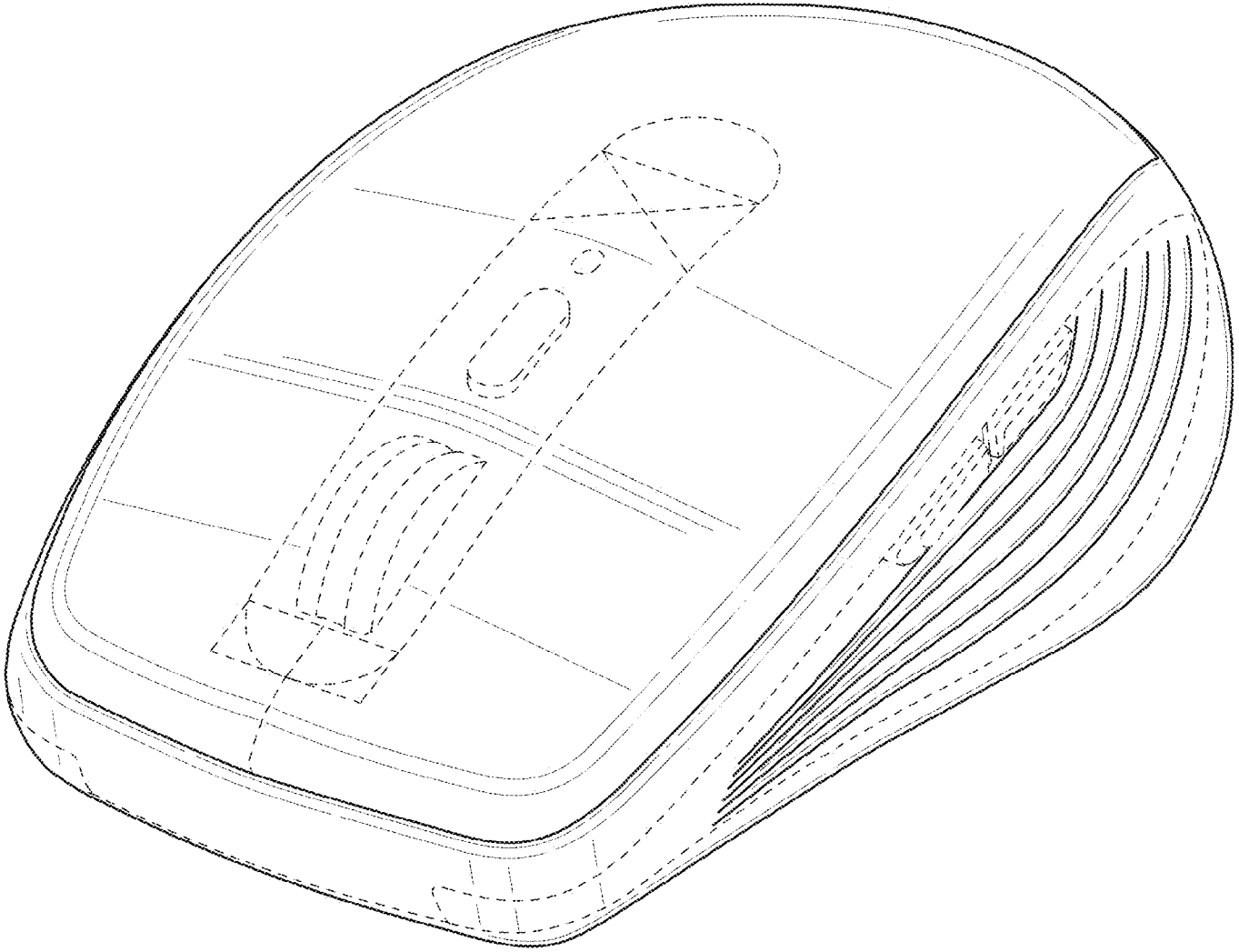
FIG. 8
New

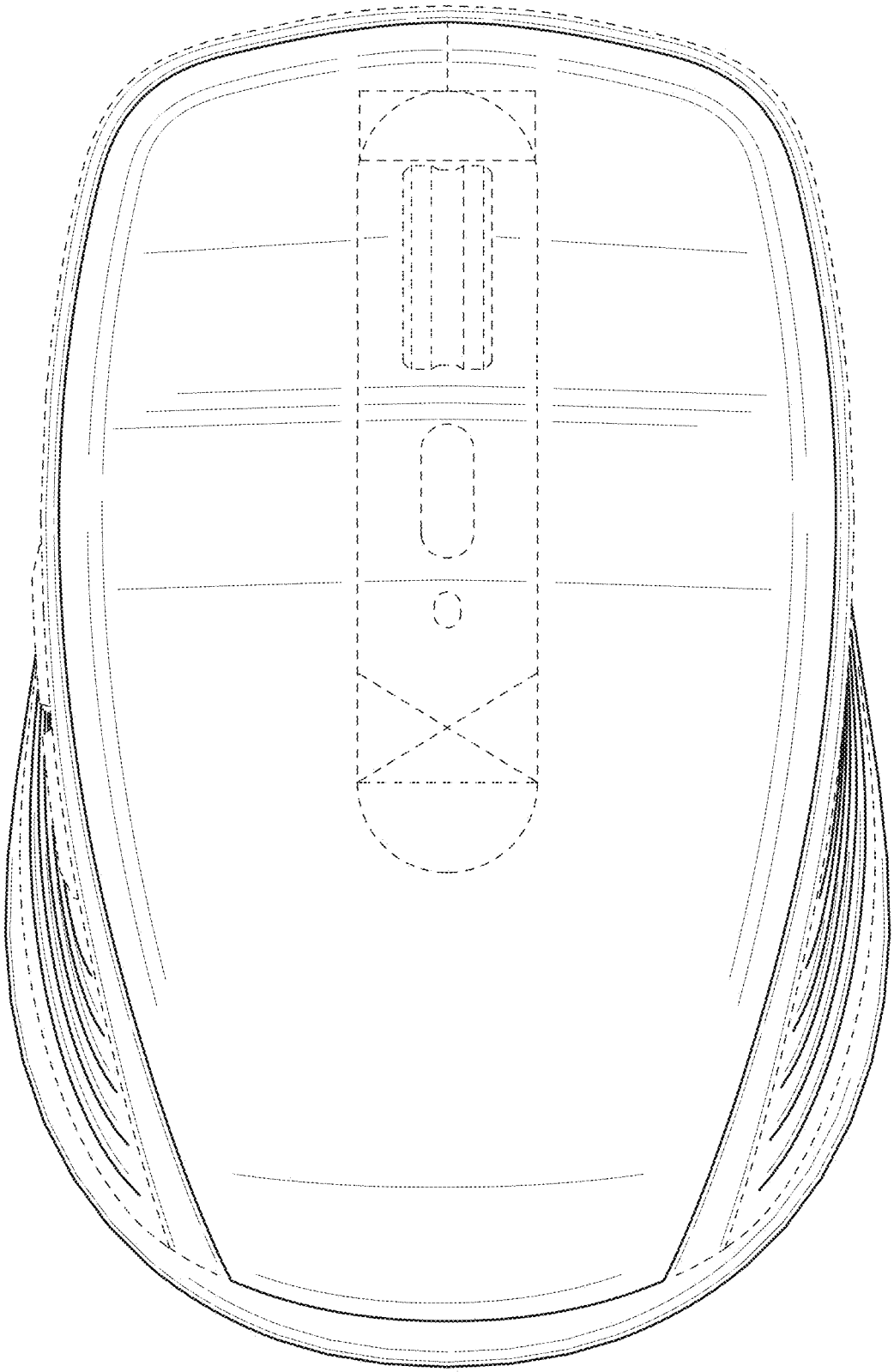
FIG. 9
New

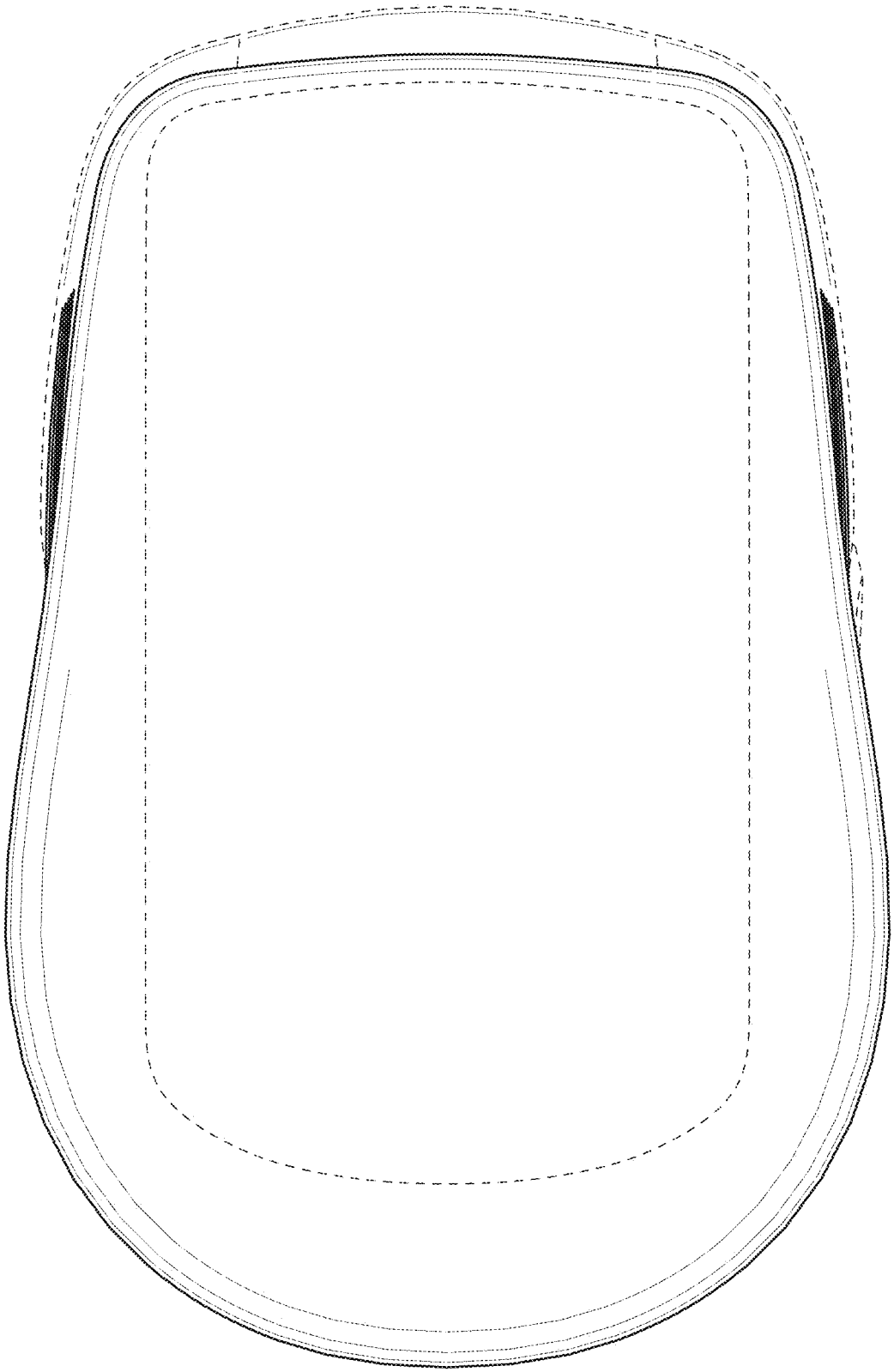
FIG. 10
New

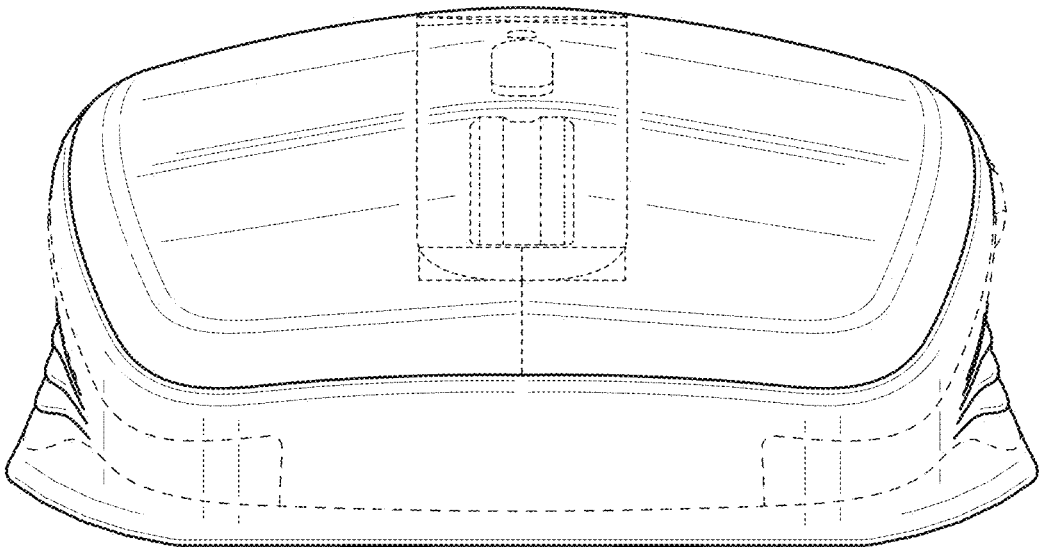
FIG. 11
New
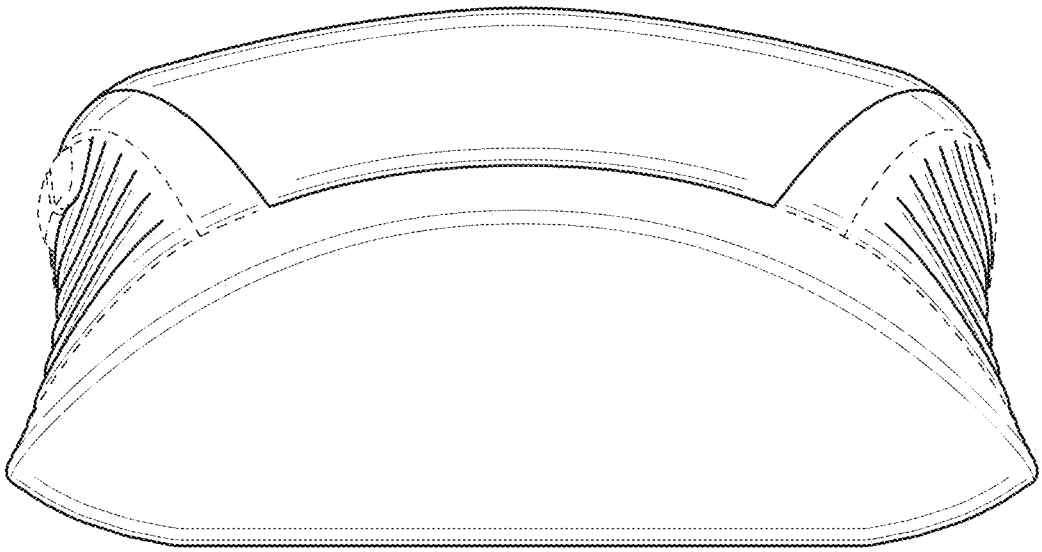
FIG. 12
New

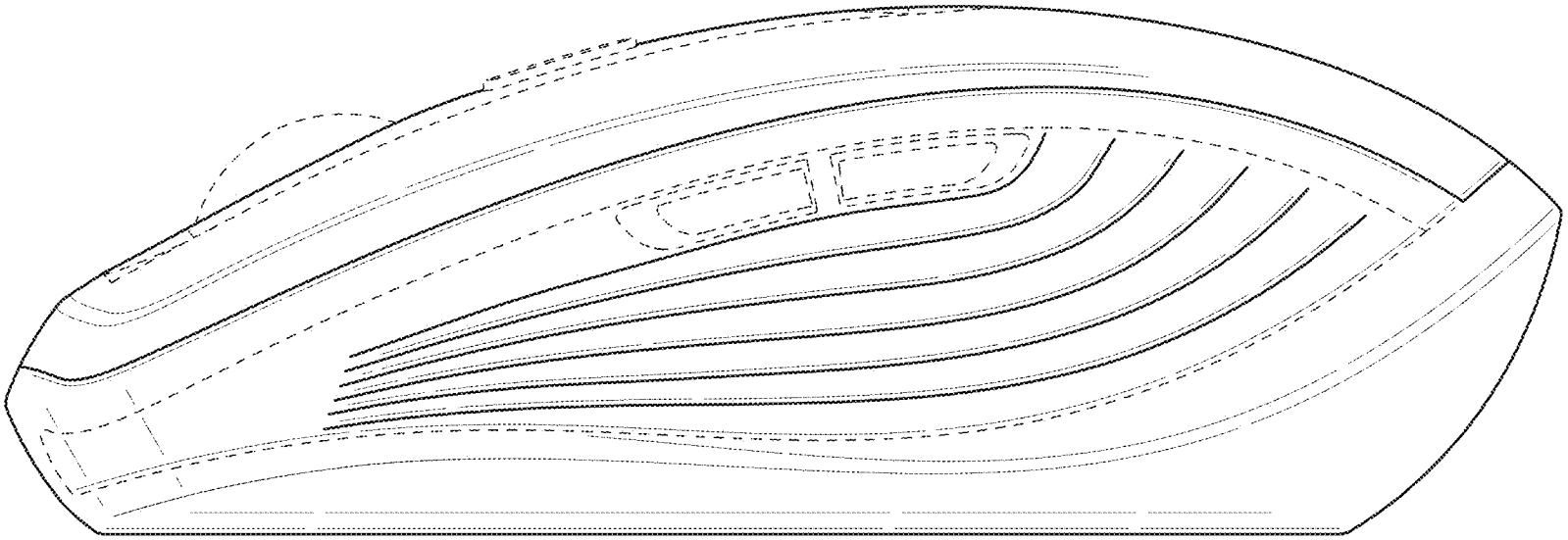
FIG. 13
New

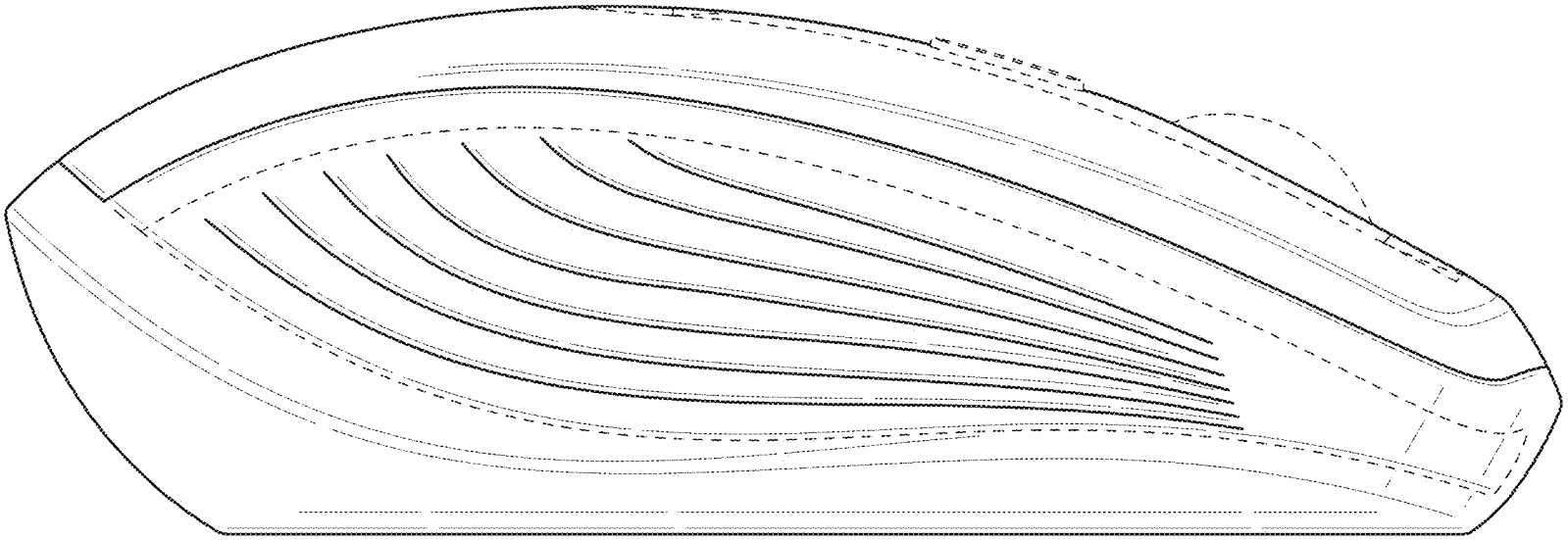
FIG. 14
New

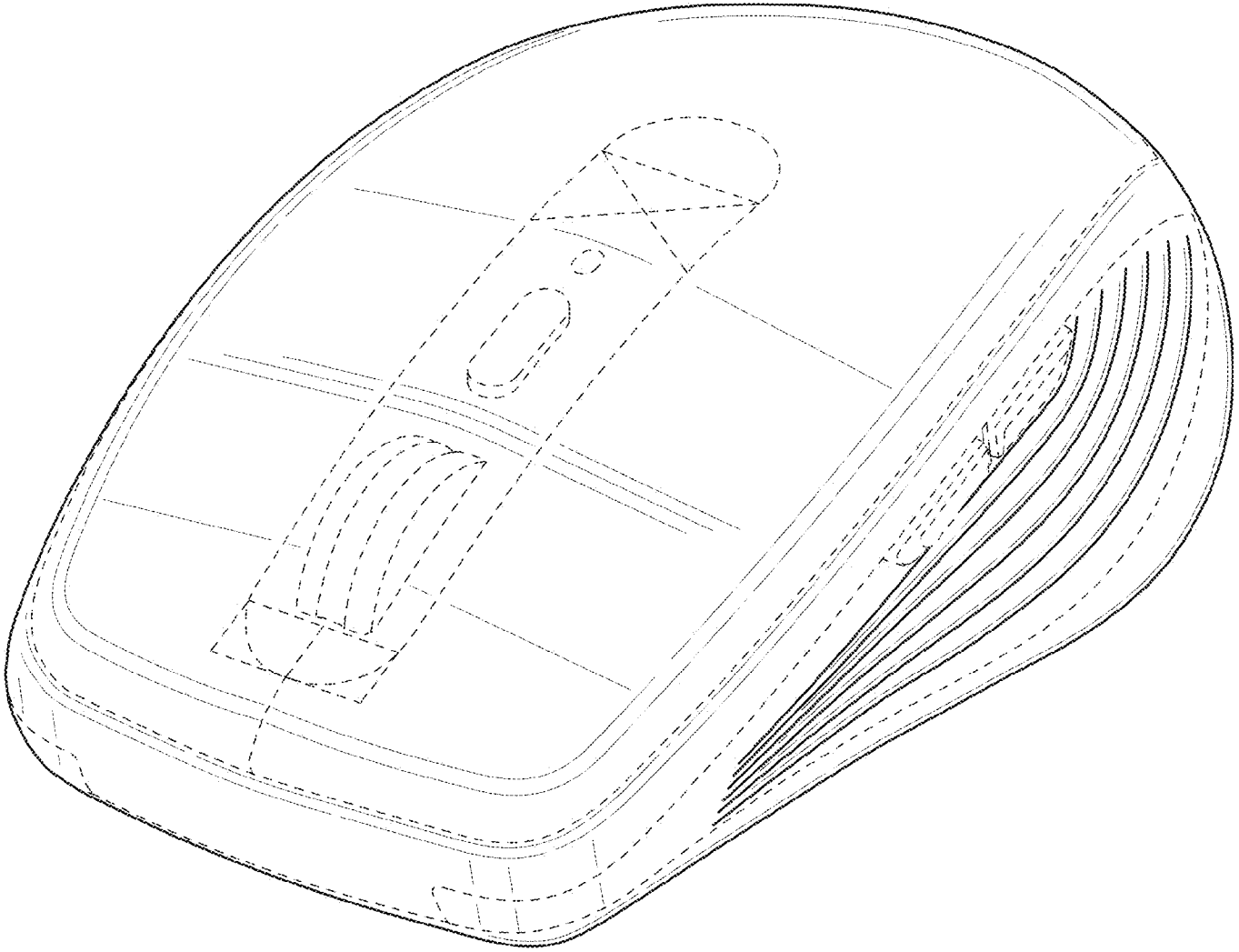
FIG. 15
New

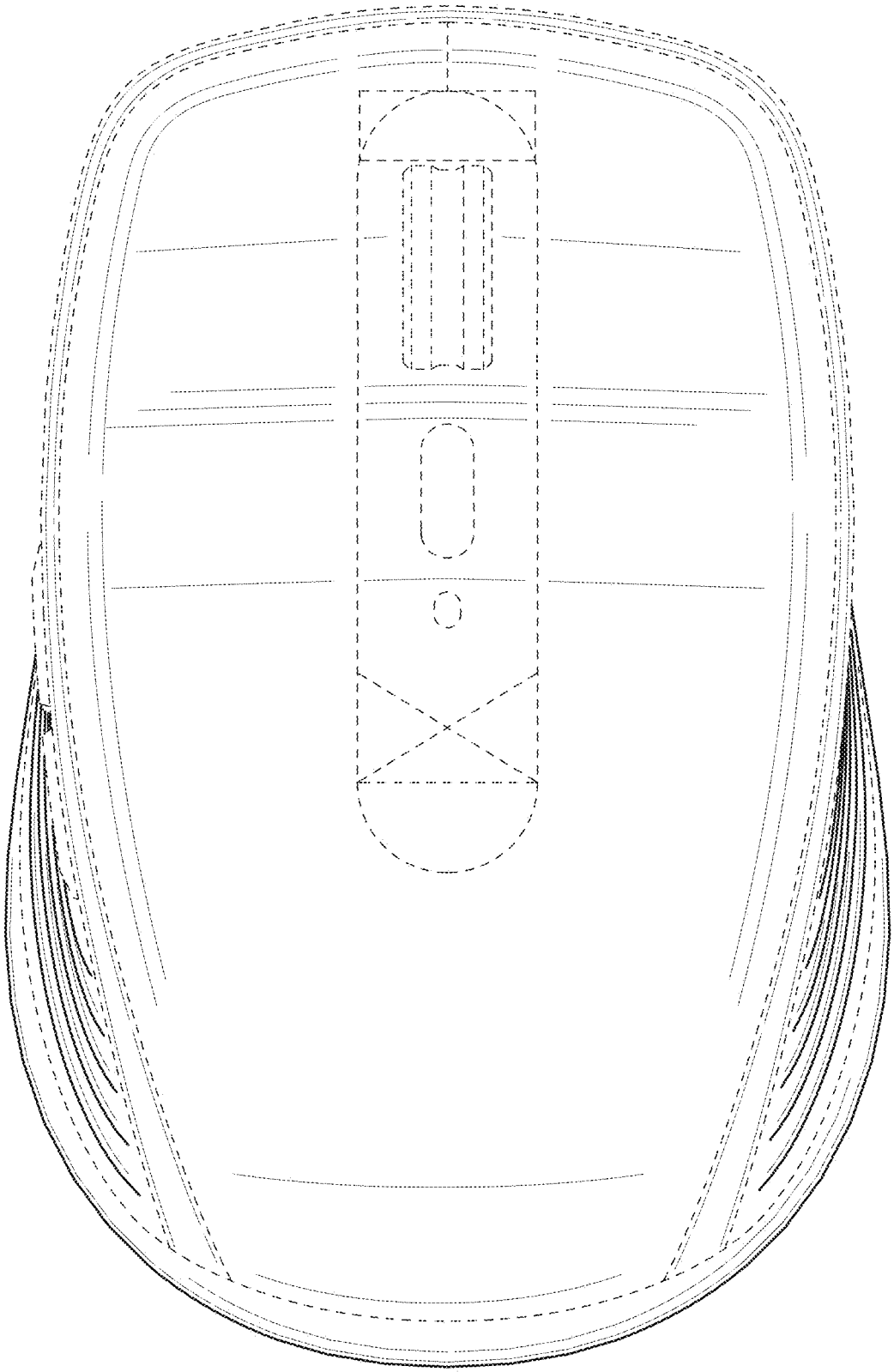
FIG. 16
New

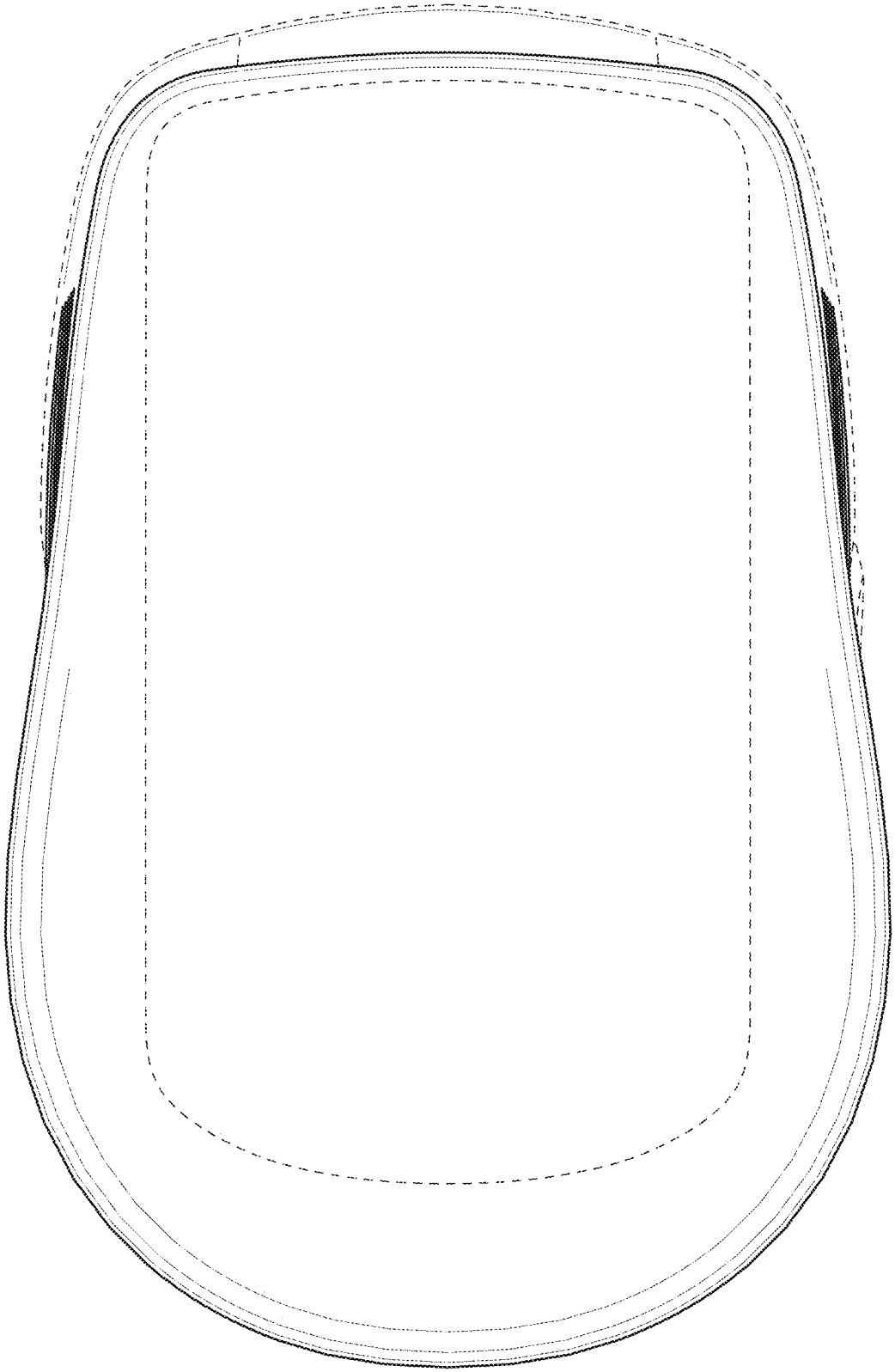
FIG. 17
New

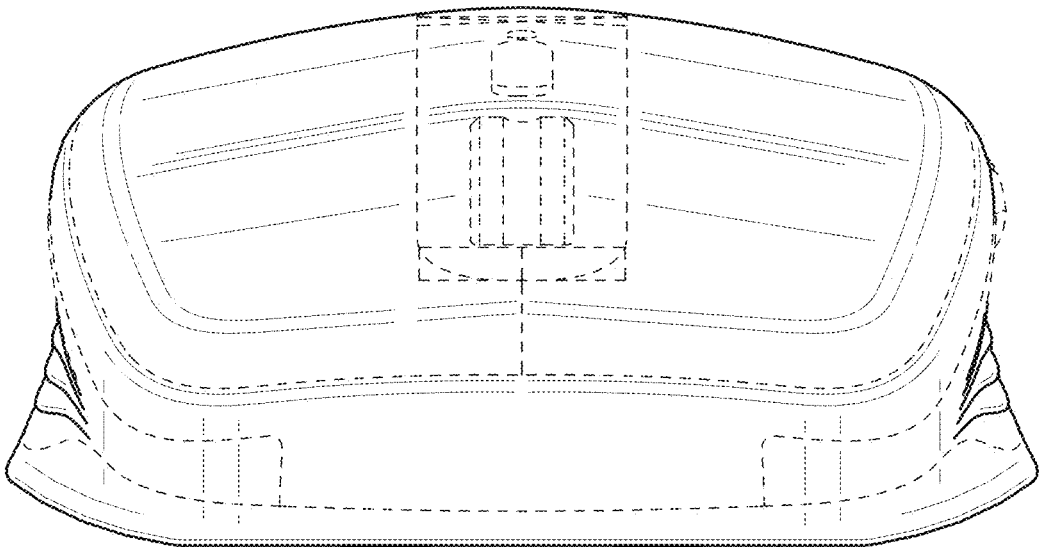
FIG. 18
New
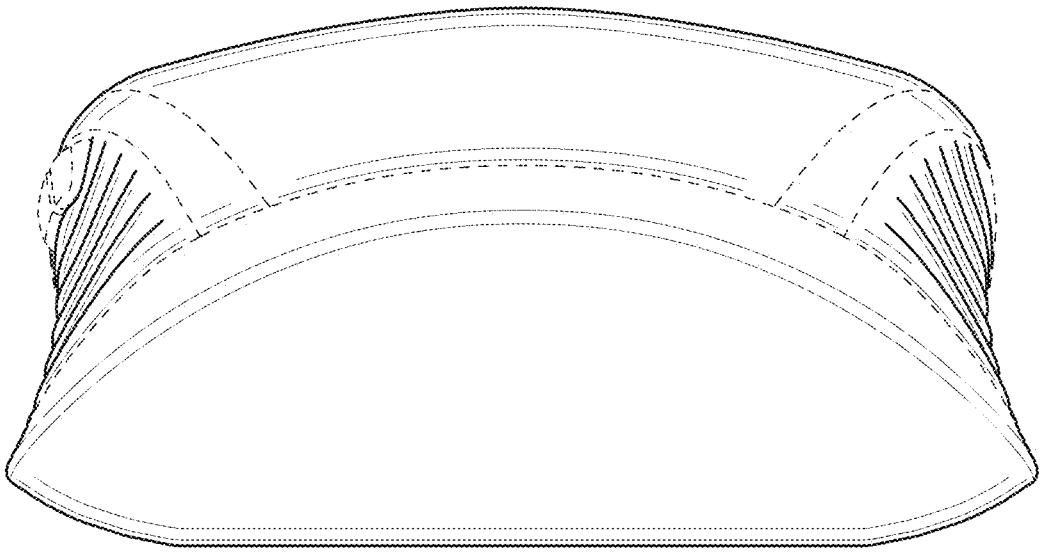
FIG. 19
New

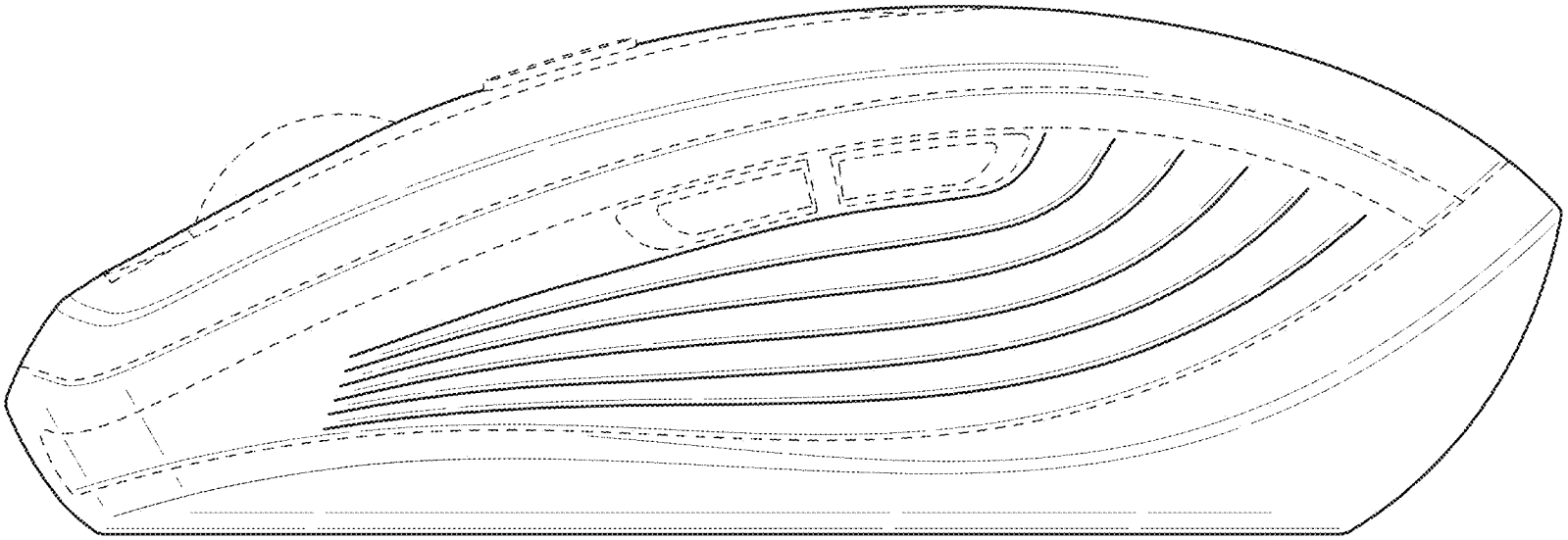
FIG. 20
New

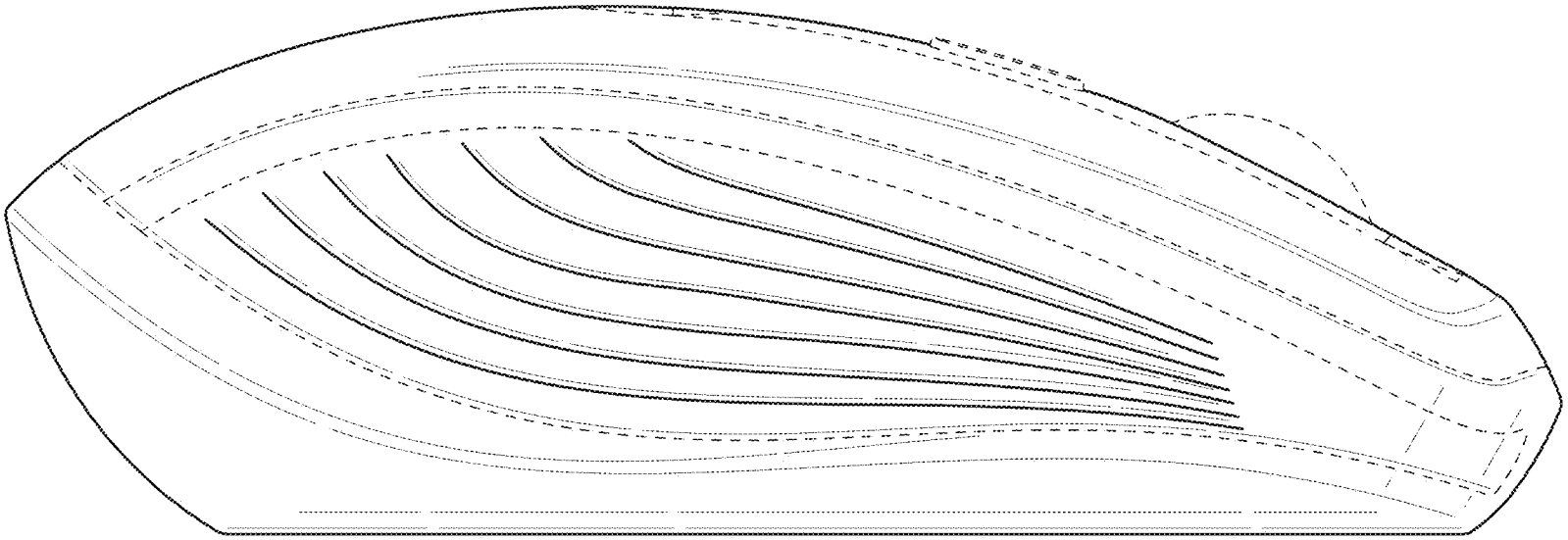
FIG. 21
New

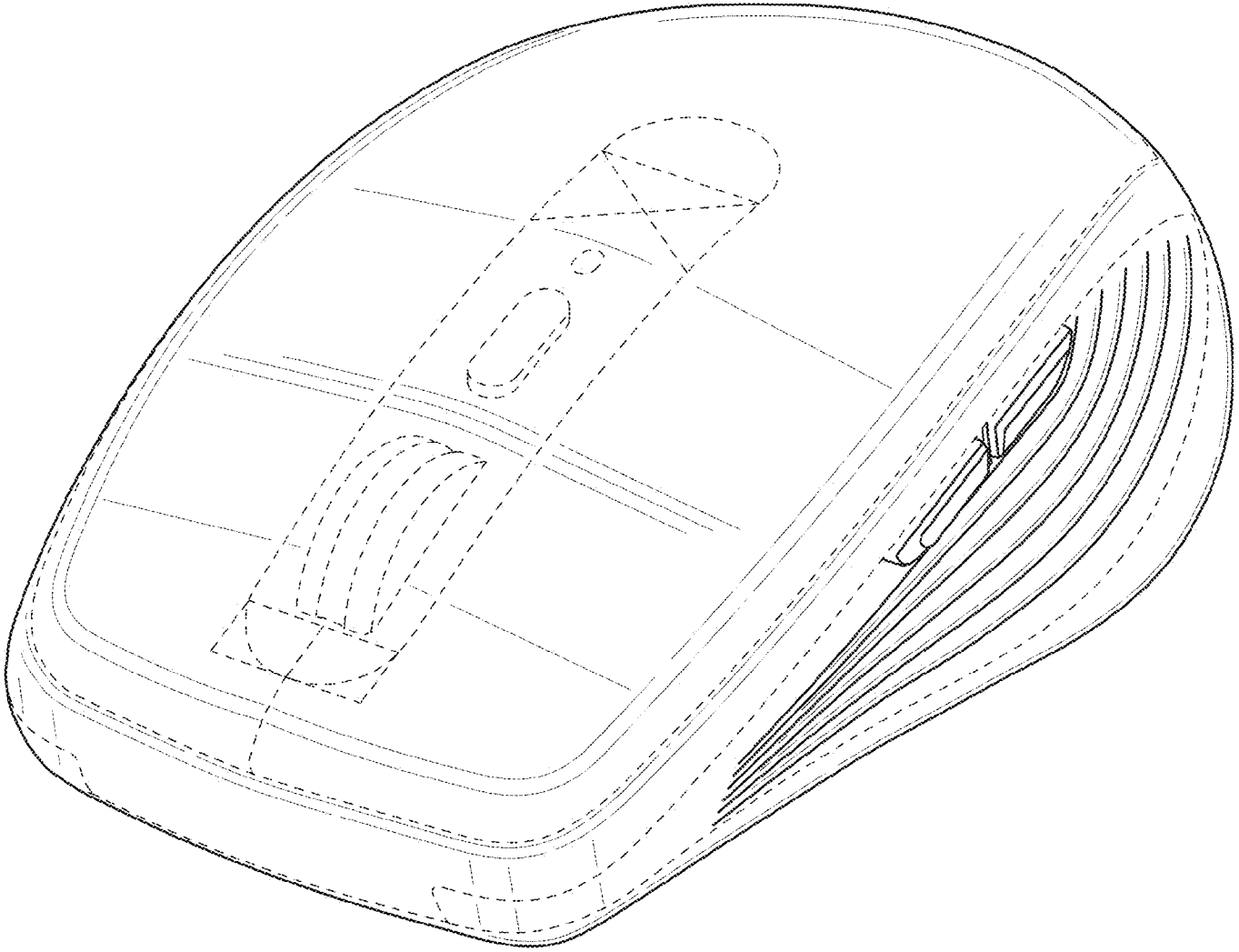
FIG. 22
New

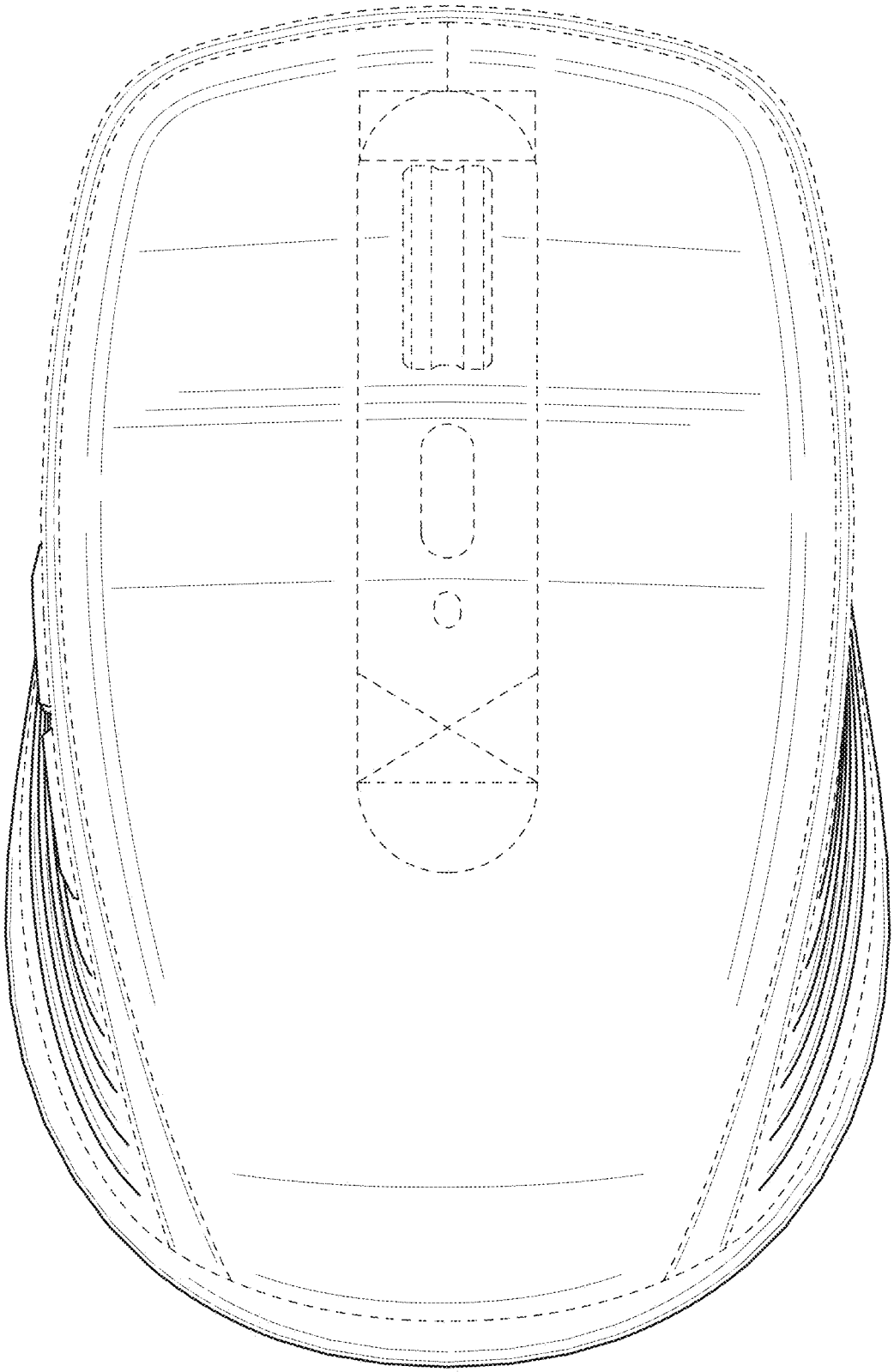
FIG. 23
New

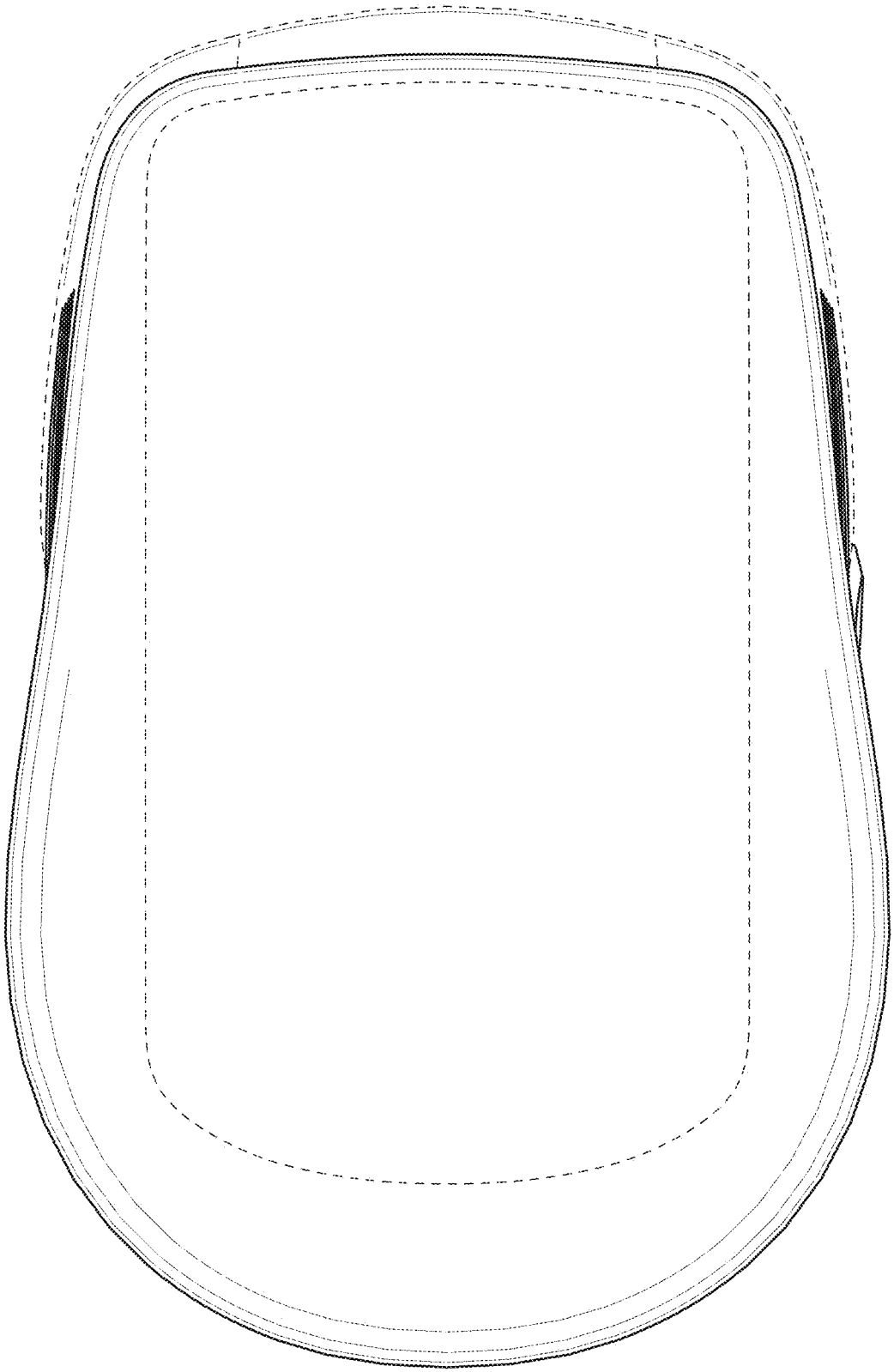
FIG. 24
New

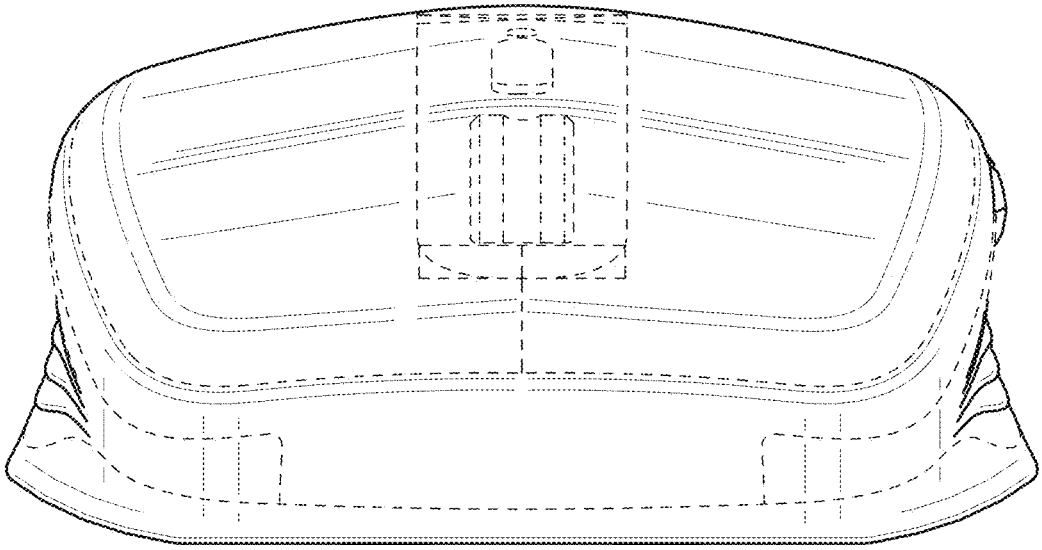
FIG. 25
New
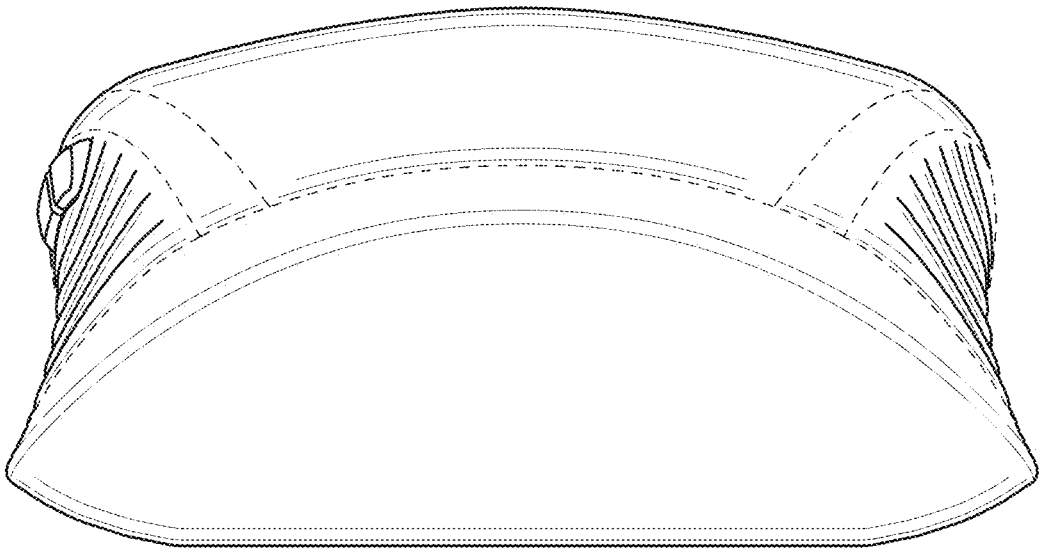
FIG. 26
New

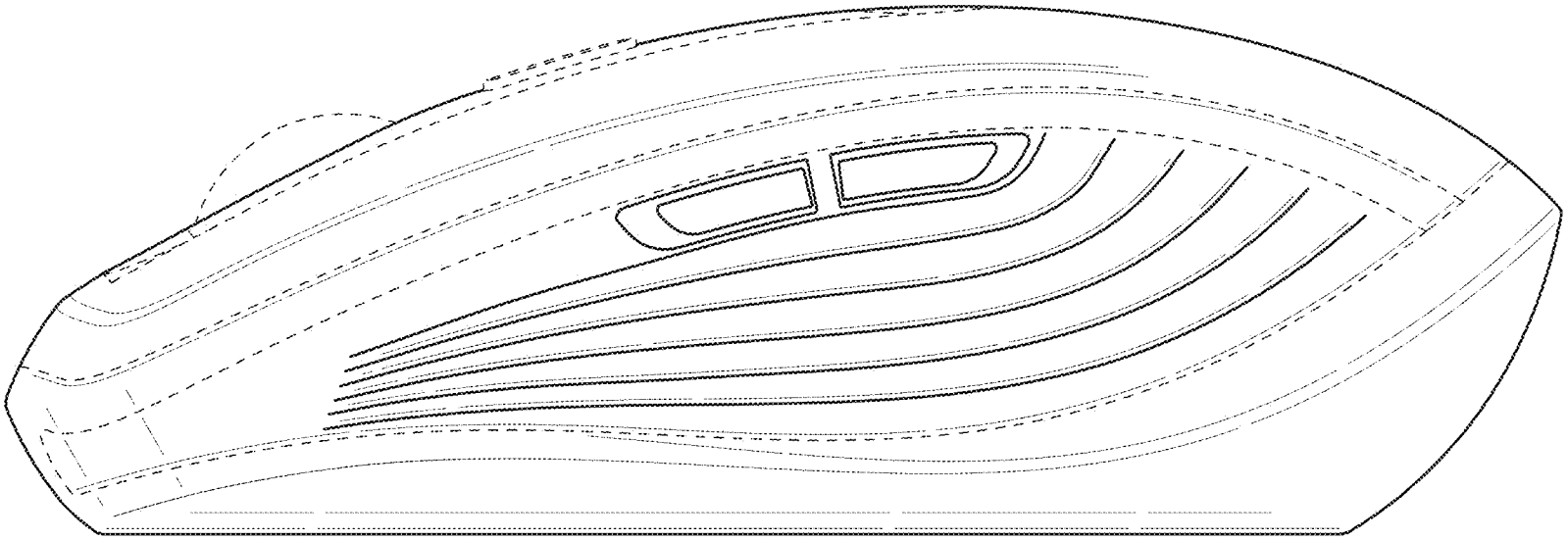
FIG. 27
New

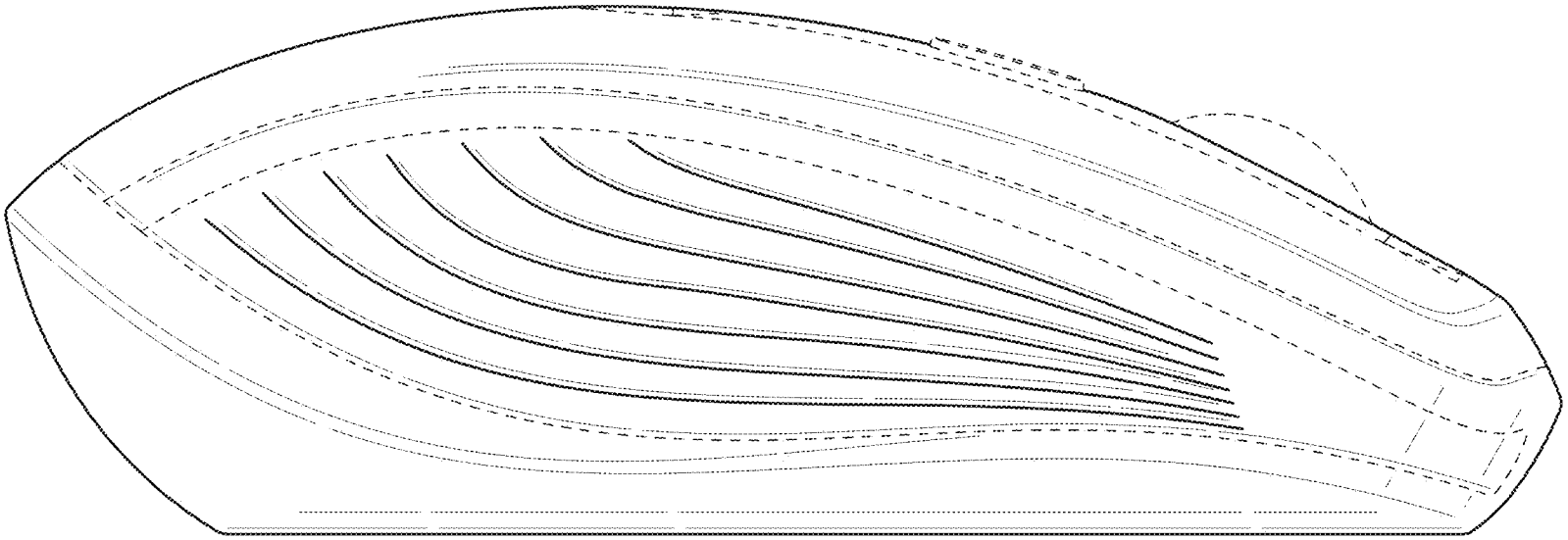
FIG. 28
New

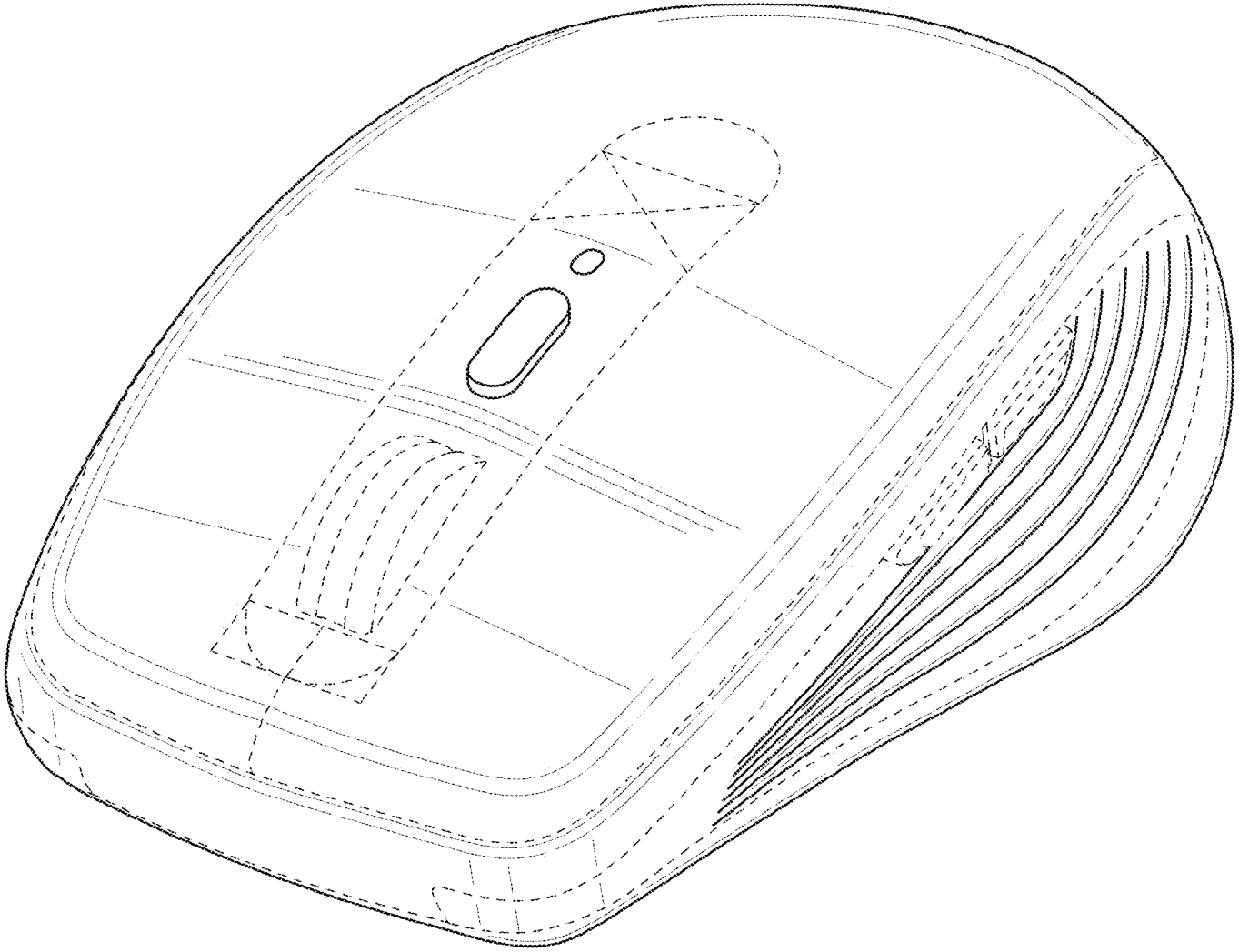
FIG. 29
New

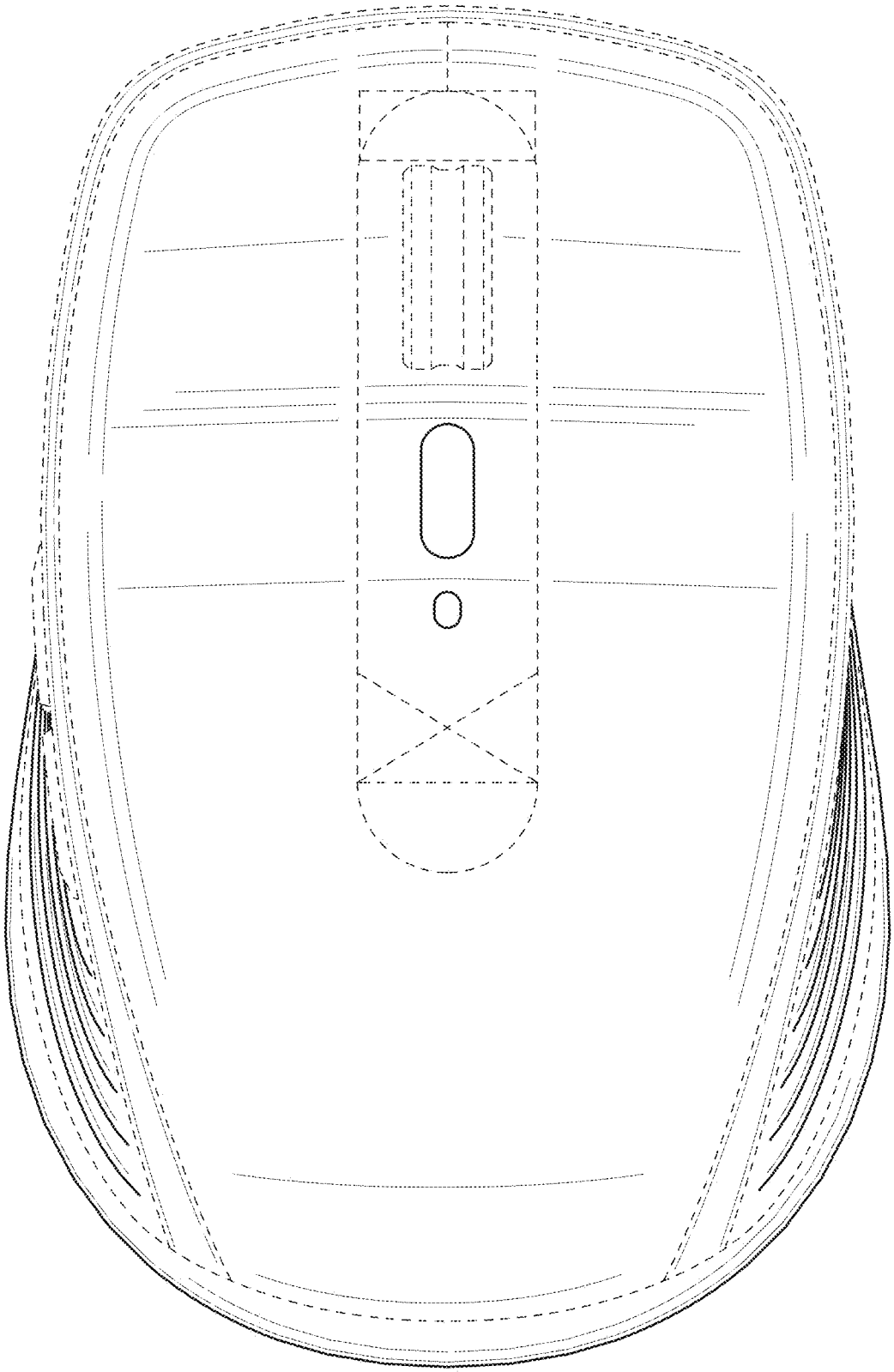
FIG. 30
New

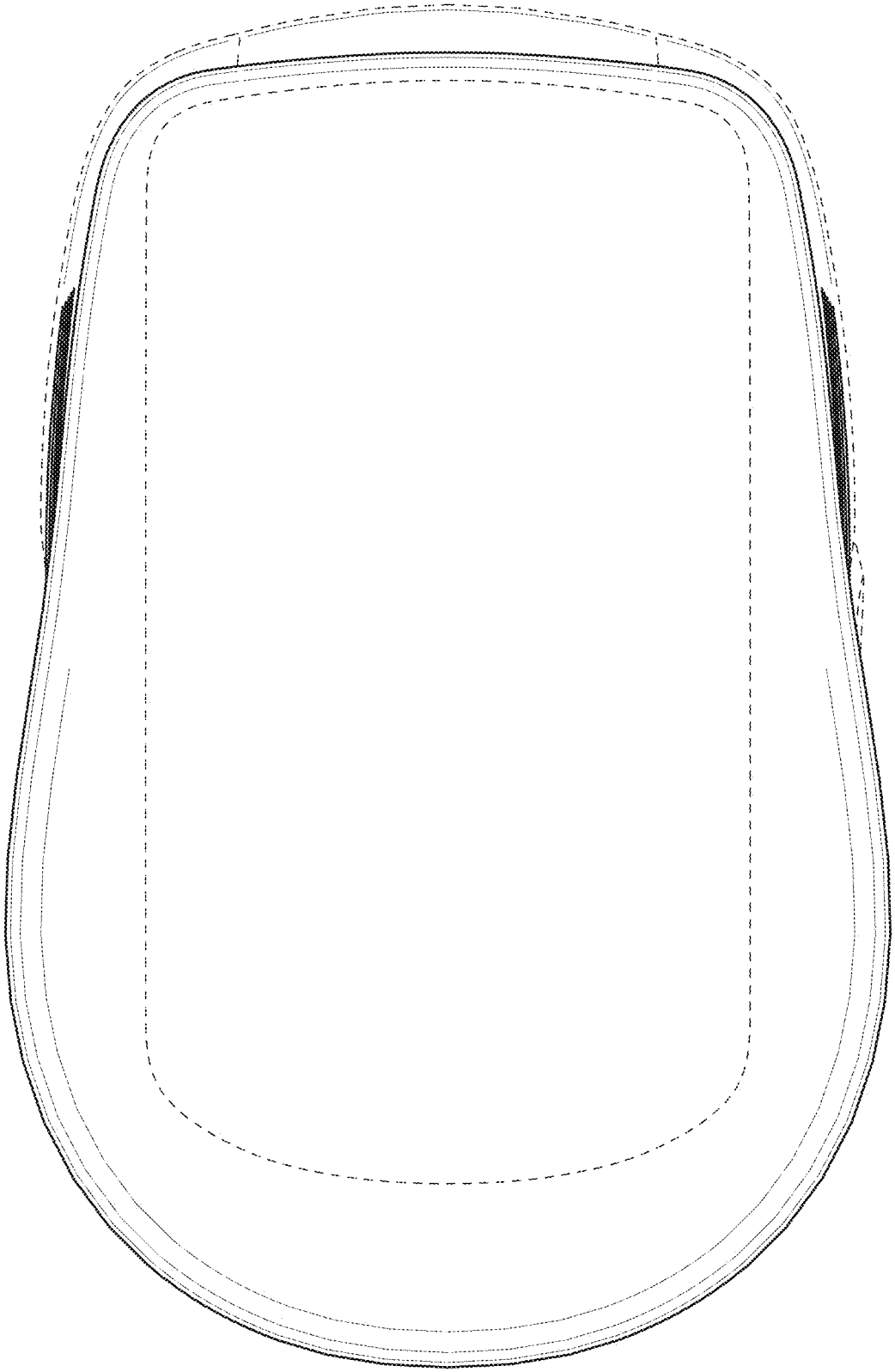
FIG. 31
New

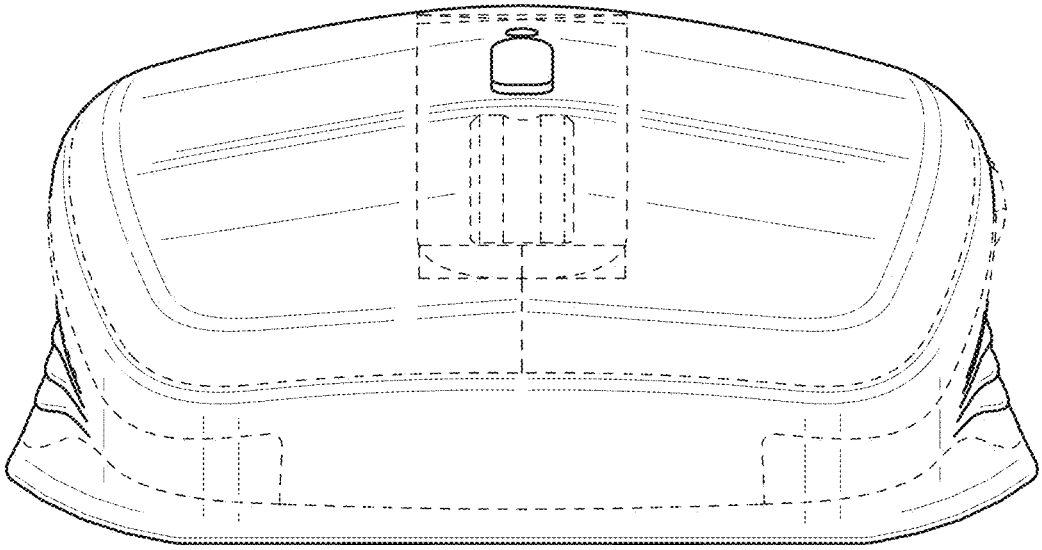
FIG. 32
New
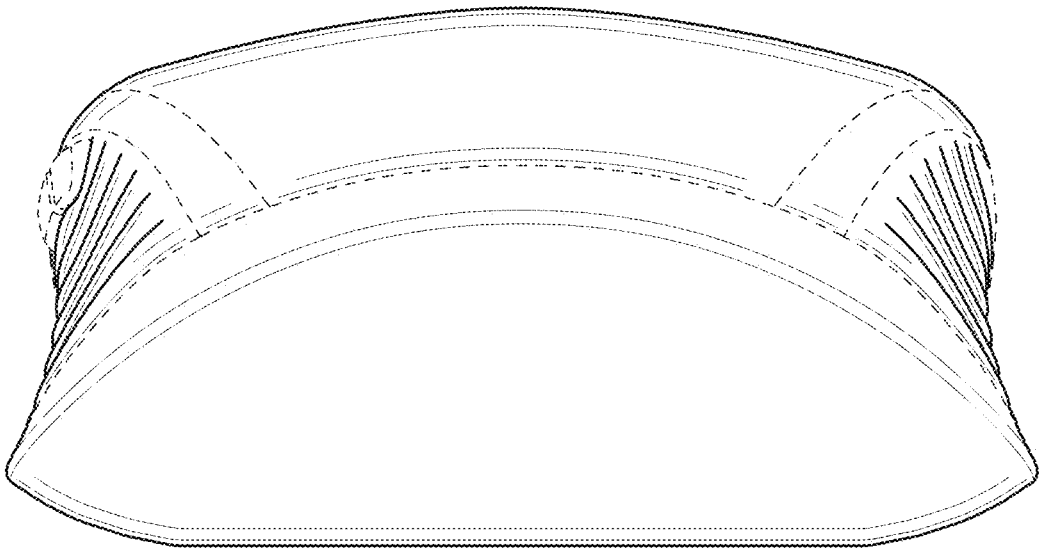
FIG. 33
New

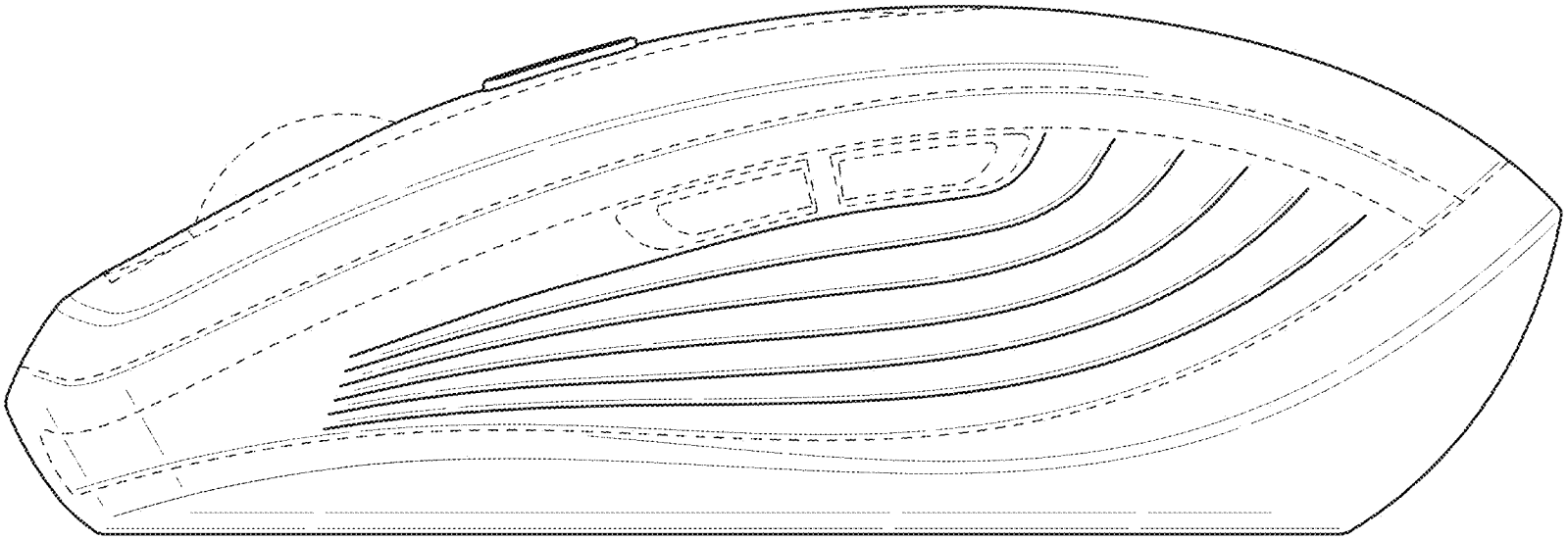
FIG. 34
New

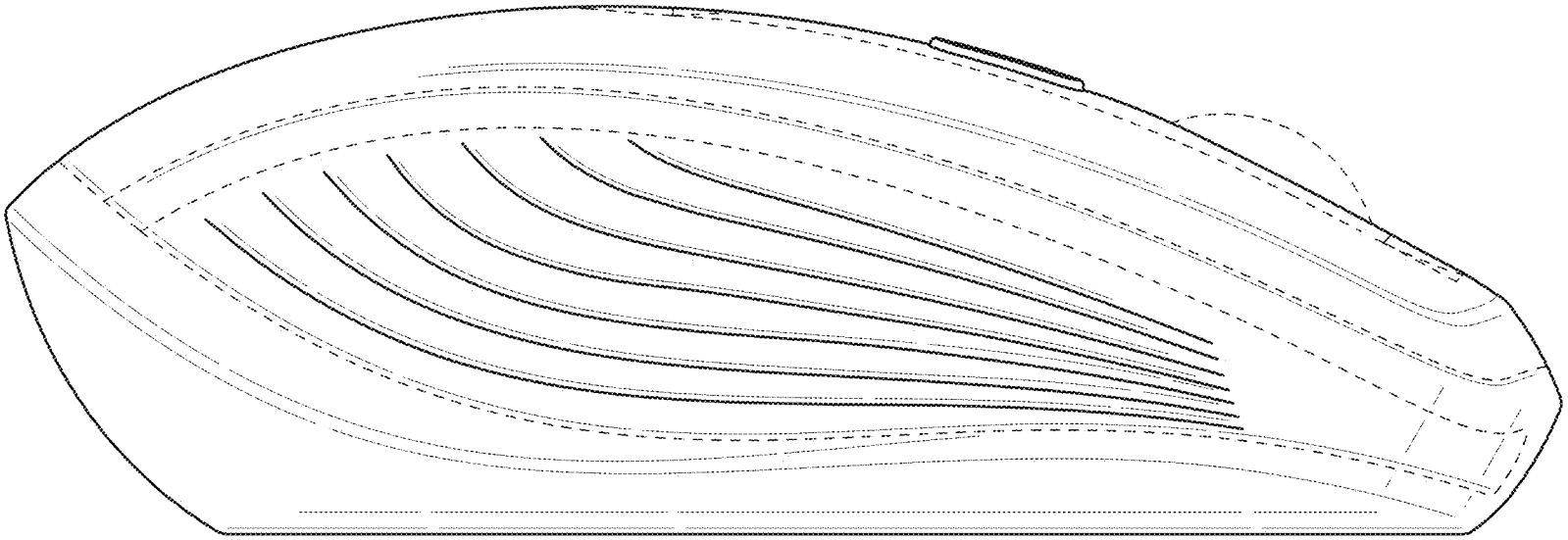
FIG. 35
New